2,921,944

BLUE DISPERSE DYESTUFFS OF THE ANTHRAQUINONE SERIES

Paul Buecheler, Binningen, and Jacques Guenthard, Basel, Switzerland, assignors to Sandoz A.G., Basel, Switzerland, a Swiss firm No Drawing. Application January 30, 1958
Serial No. 712,065

Claims priority, application Switzerland
February 15, 1957

6 Claims. (Cl. 260—376)

This invention relates to a process for the production of blue disperse dyestuffs of the anthraquinone series. It consists in reacting 1 mol of 1.4-diaminoanthraquinone-2.3-dicarboxylic acid with 2 mols of a sulfonic acid ester of the formula $$R_1—SO_2—O—R \qquad (I)$$

wherein R stands for an alkyl radical which may be further substituted and $R_1$ for an aromatic, aliphatic, cycloaliphatic or arylaliphatic radical.

The reaction is carried out in a weakly basic organic medium or in dimethyl sulfoxide in presence of an alkali or alkaline earth metal compound of weakly alkaline reaction as an acid-binding agent and with exclusion of water. The permissible temperature range is 40 to 120° C., but 70 and 95° C. are the preferred limits. The employed amount of the sulfonic acid ester must be at least 2 mols to 1 mol of 1.4-diaminoanthraquinone-2.3-dicarboxylic acid. However, it is advantageous to employ an excess in order to obtain a good yield.

Suitable materials for the weakly basic organic medium are tertiary amines, e.g., pyridine, pyridine bases either singly or in mixture, dimethylaniline or diethylaniline, mixtures of a tertiary amine and a neutral organic solvent, mixtures of a tertiary amine and dimethyl sulfoxide, and ternary mixtures of a tertiary amine, dimethyl sulfoxide and a neutral organic solvent. In this context the term neutral organic solvent refers to benzene, toluene, xylene, dioxane, chloro-, dichloro- and nitrobenzene; also suitable are the anhydrous alcohols. Alternatively, the sulfonic acid ester used as reagent can perform the additional function of a neutral organic solvent.

The following are enumerated as examples of alkali or alkaline earth metal compounds of weakly alkaline reaction: sodium and potassium bicarbonate; lithium, sodium, potassium, magnesium and calcium carbonate; magnesium and calcium oxide; sodium and potassium acetate; secondary sodium phosphate; sodium and potassium cyanide; and mixtures of two or more such compounds, e.g., sodium acetate and magnesium oxide, potassium acetate and calcium carbonate, etc.

The addition of an alkali or alkaline earth compound of weakly alkaline reaction renders harmless the sulfonic acid liberated during the reaction. The alkali metal hydroxides, which are of strongly alkaline reaction, are less suitable as they form salts with the 1.4-diaminoanthraquinone-2.3-dicarboxylic acid.

To isolate the product the reaction mass is poured into water and the residual acid-binding agent neutralized if desired. If a neutral solvent has been used it is eliminated by distillation with water steam, after which the water-insoluble dyestuff is filtered off with suction. It can be purified by redissolving in benzene and precipitation, or by dissolving in pyridine and precipitation in the pure form by the addition of water.

The reaction products are generally obtained as blue powders which dissolve in common organic solvents with a blue coloration. In concentrated sulfuric acid they give solutions which are colorless or pale yellow, but which change to green-blue upon the addition of paraformaldehyde. When brought into a finely divided state, for example by grinding in aqueous solution in presence of a suitable dispersing agent, they exhibit very good affinity for cellulose ester, cellulose ether, linear aromatic polyester, polyamide and polyacrylonitrile fibers. They thus have excellent suitability for dyeing and printing these materials, on which they produce brilliant blue shades of very good fastness to light, washing, perspiration, sublimation, pressing, and heat-setting treatments including permanent pleating. On cellulose ester fibers they show fairly good fastness to gas fumes and good fastness to acetic acid, whilst the dyeings on polyester fibers are resistant to 2% aqueous mineral acid solution. Those products which possess sufficiently high solubility in organic solvents are also suitable for dyeing artificial fibers dissolved in such solvents prior to spinning, and for coloring plastics and lacquer media in the mass. In these fields of application they yield dyeings and colorations which have very good fastness to light, washing, sublimation and pleating.

In the examples which follow all parts and percentages are by weight and the temperatures are given in degrees centigrade.

EXAMPLE 1

The reaction solution, consisting of 8 parts of 1.4-diaminoanthraquinone-2.3-dicarboxylic acid, 40 parts of chlorobenzene, 4 parts of pyridine, 10 parts of sodium bicarbonate and 23 parts of benzenesulfonic acid ethyl ester, is kept in constant agitation for 16 hours at 86° and then run into 200 parts of water. The mixture is weakly acidified with hydrochloric acid and the chlorobenzene distilled off with water steam, upon which the precipitate is filtered off, washed with hot water and dried. The reaction product is dissolved in pyridine, the solution filtered, and the dyestuff precipitated in its pure form by the addition of a dilute sodium hydroxide solution. It melts at 150–152° and dissolves with a bright blue coloration in all the commonly used organic solvents. In concentrated sulfuric acid it is practically colorless, but the solution turns green-blue upon the addition of paraformaldehyde.

In place of chlorobenzene, as used in this example, the reaction can be conducted with an equal quantity of nitrobenzene or toluene. The mixture of chlorobenzene and pyridine can be similarly replaced by an equal amount of dimethyl sulfoxide. Good results are obtained when in place of the 23 parts of benzenesulfonic acid ethyl ester an equal quantity of ethanesulfonic acid ethyl ester is employed, or again when 10 parts of sodium, potassium or calcium carbonate or an equivalent amount of magnesium or calcium oxide are added as an acid-binding agent.

The dyeing procedure is as follows:

1 part of the above-described reaction product, 1 part of the sodium salt of dinaphthylmethanedisulfonic acid and 8 parts of water are ground together until a fine dispersion is obtained. This is run into a dyebath of 3000 parts of water and 6 parts of Marseilles soap. A length of cellulose acetate fabric, 100 parts by weight, is entered in the dyebath, which is then heated to 80° in the course of 30 minutes and maintained at this temperature for 1 hour. The fabric is removed from the dyebath, rinsed in water and dried. It is dyed in a bright clear shade of blue which has excellent fastness to light, washing, sublimation and pleating.

Bright and clear blue dyeings with very good fastness properties are also obtained on fibers and fabrics of linear aromatic polyesters, using the above dyebath at 98° with the extra addition of a suitable swelling agent.

EXAMPLE 2

8 parts of 1.4-diaminoanthraquinone-2.3-dicarboxylic acid, 60 parts of pyridine, 80 parts of 4-methylbenzenesulfonic acid n-butyl ester and 45 parts of anhydrous sodium carbonate are mixed for 16 hours at 25° and thereafter for 20 hours at 43°. The reaction mass is poured into 2000 parts of water, and the precipitate is filtered off, washed with water and dried.

The reaction product thus obtained melts at 116–118°. It possesses similar dyeing properties to the dyestuff obtained according to the particulars of Example 1.

EXAMPLE 3

8 parts of 1.4-diaminoanthraquinone-2.3-dicarboxylic acid, 40 parts of chlorobenzene, 4 parts of pyridine, 10 parts of sodium bicarbonate and 40 parts of 4-methylbenzenesulfonic acid n-dodecyl ester are mixed together for 3 hours at 92°. The reaction mass is run into 200 parts of water and weakly acidified with sulfuric acid, upon which the chlorobenzene is distilled off with water steam. 20 parts of pyridine and 2 parts of sodium hydroxide are added to the cooled aqueous suspension, which is agitated for a further 4 hours at 25°. The precipitated dyestuff is subsequently filtered off and washed with water. It can be purified by recrystallization from 300 parts of methyl alcohol and 10 parts of water. In the pure form it melts at 68–69° and possesses similar properties to the dyestuffs obtained according to Examples 1 and 2.

By a procedure analogous to those described in the foregoing examples, 1.4-diaminoanthraquinone-2.3-dicarboxylic acid can be reacted with the esters named in the following table.

Table

| Example No. | Ester | Color of Reaction Product Dissolved in Benzene |
|---|---|---|
| 4 | ethanesulfonic acid n-propyl ester | bright blue. |
| 5 | cyclohexanesulfonic acid ethyl ester | Do. |
| 6 | phenylmethanesulfonic acid isoamyl ester | Do. |
| 7 | butanesulfonic acid n-hexyl ester | Do. |
| 8 | methanesulfonic acid n-decyl ester | Do. |
| 9 | 4-methylbenzenesulfonic acid n-tetradecyl ester. | Do. |
| 10 | 4-methylbenzenesulfonic acid (2'-chloro)-ethyl ester. | blue. |
| 11 | 4-methylbenzenesulfonic acid (2'-ethoxy)-ethyl ester. | bright blue. |
| 12 | 4-methylbenzenesulfonic acid benzyl ester. | blue. |
| 13 | 4-methylbenzenesulfonic acid (3'-methoxy)-butyl ester. | bright blue. |
| 14 | 4-methylbenzenesulfonic acid isopropyl ester. | Do. |
| 15 | 2-napthalenesulfonic acid ethyl ester | Do. |
| 16 | 4-methylbenzenesulfonic acid methyl ester | Do. |

EXAMPLE 17

100 parts of secondary cellulose acetate with a content of 54–55% of splittable acetic acid are dissolved in 300 parts of a solvent (e.g., a mixture of 275 parts of acetone and 25 parts of methanol). After homogeneous mixing the mass is left overnight to swell. Next day 1 part of the reaction product obtained according to Example 1 is dissolved in 100 parts of the same solvent. This solution is added to the cellulose acetate solution and the whole is agitated long enough for 100 parts of the solvent to evaporate.

The dyed acetate solution is filtered through a cotton filter and a cotton wool pressure filter before entering the spinning unit. The final phase of the operation, to the formation of the dyed filament, is the same as in the production of undyed cellulose acetate.

Having thus disclosed the invention what is claimed is:

1. Blue disperse dyestuffs of the anthraquinone series obtained by reacting 1 mol of 1.4-diaminoanthraquinone-2.3-dicarboxylic acid with 2 mols of a sulfonic acid ester of the formula $$R_1-SO_2-O-R \qquad (I)$$

wherein R stands for a member selected from the group consisting of an alkyl radical, an alkoxyalkyl radical, a mononuclear arylalkyl radical and a choro-alkyl radical, and $R_1$ stands for a member selected from the group consisting of phenyl, methylphenyl, naphthyl, cyclohexyl, phenylmethyl and alkyl with a maximum of four carbon atoms, in an organic medium in presence of an acid-binding agent of weakly alkaline reaction and at a temperature of 40 to 120° C.

2. The blue disperse dyestuff of the anthraquinone series obtained by reacting 1 mol of 1.4-diaminoanthraquinone-2.3-dicarboxylic acid with 2 mols of benzenesulfonic acid ethyl ester at a temperature of 40 to 120° C. in a tertiary amine, as organic medium, and in presence of an acid-binding agent of weakly alkaline reaction.

3. The blue disperse dyestuff of the anthraquinone series obtained by reacting 1 mol of 1.4-diaminoanthraquinone-2.3-dicarboxylic acid with 2 mols of 4-methylbenzenesulfonic acid n-butyl ester at a temperature of 40 to 120° C. in a tertiary amine, as organic medium, and in presence of an acid-binding agent of weakly alkaline reaction.

4. The blue disperse dyestuff of the anthraquinone series obtained by reacting 1 mol of 1.4-diaminoanthraquinone-2.3-dicarboxylic acid with 2 mols of ethanesulfonic acid n-propyl ester at a temperature of 40 to 120° C. in a tertiary amine, as organic medium, and in presence of an acid-binding agent of weakly alkaline reaction.

5. The blue disperse dyestuff of the anthraquinone series obtained by reacting 1 mol of 1.4-diaminoanthraquinone-2.3-dicarboxylic acid with 2 mols of 4-methylbenzenesulfonic acid (2'-chloro)-ethyl ester at a temperature of 40 to 120° C. in a tertiary amine, as organic medium, and in presence of an acid-binding agent of weakly alkaline reaction.

6. The blue disperse dyestuff of the anthraquinone series obtained by reacting 1 mol of 1.4-diaminoanthraquinone-2.3-dicarboxylic acid with 2 mols of 4-methylbenzenesulfonic acid isopropyl ester at a temperature of 40 to 120° C. in a tertiary amine, as organic medium, and in presence of an acid-binding agent of weakly alkaline reaction.

References Cited in the file of this patent

UNITED STATES PATENTS 2,823,212      Anton et al. _____ Feb. 11, 1958